M. WILKENFELD.
FENDER.
APPLICATION FILED NOV. 15, 1919.

1,333,522.

Patented Mar. 9, 1920.
2 SHEETS—SHEET 1.

INVENTOR.
BY *Myer Wilkenfeld.*
*Victor J. Evans*
ATTORNEY.

INVENTOR.
BY *Myer Wilkenfeld.*
*Victor J. Evans*
ATTORNEY.

UNITED STATES PATENT OFFICE.

MYER WILKENFELD, OF BROOKLYN, NEW YORK.

FENDER.

1,333,522. Specification of Letters Patent. Patented Mar. 9, 1920.

Application filed November 15, 1919. Serial No. 338,218.

*To all whom it may concern:*

Be it known that I, MYER WILKENFELD, a citizen of the United States, residing at Brooklyn, in the county of Kings and State of New York, have invented new and useful Improvements in Fenders, of which the following is a specification.

This invention relates to fenders for vehicles and is particularly applicable for use upon automobiles.

Some of the objects of the invention are: to produce a device of this character which embodies a structure capable of being attached to a vehicle, which structure embraces a plurality of frames or members, certain of which have fixed relation with respect to the vehicle, while others are movable to permit their being folded upon the fixed frames; to produce a fender which embodies a plurality of frames, certain of which carry cushioning means; to produce a fender whose movable parts may be instantaneously brought to active positions, as a diligent effort to avoid serious accidents. With the above and other objects in view the invention resides in the particular combination and arrangement of parts more fully described in the following specification and illustrated in the accompanying drawings and set forth in the claims hereunto appended.

In the drawings:—

Figure 1:
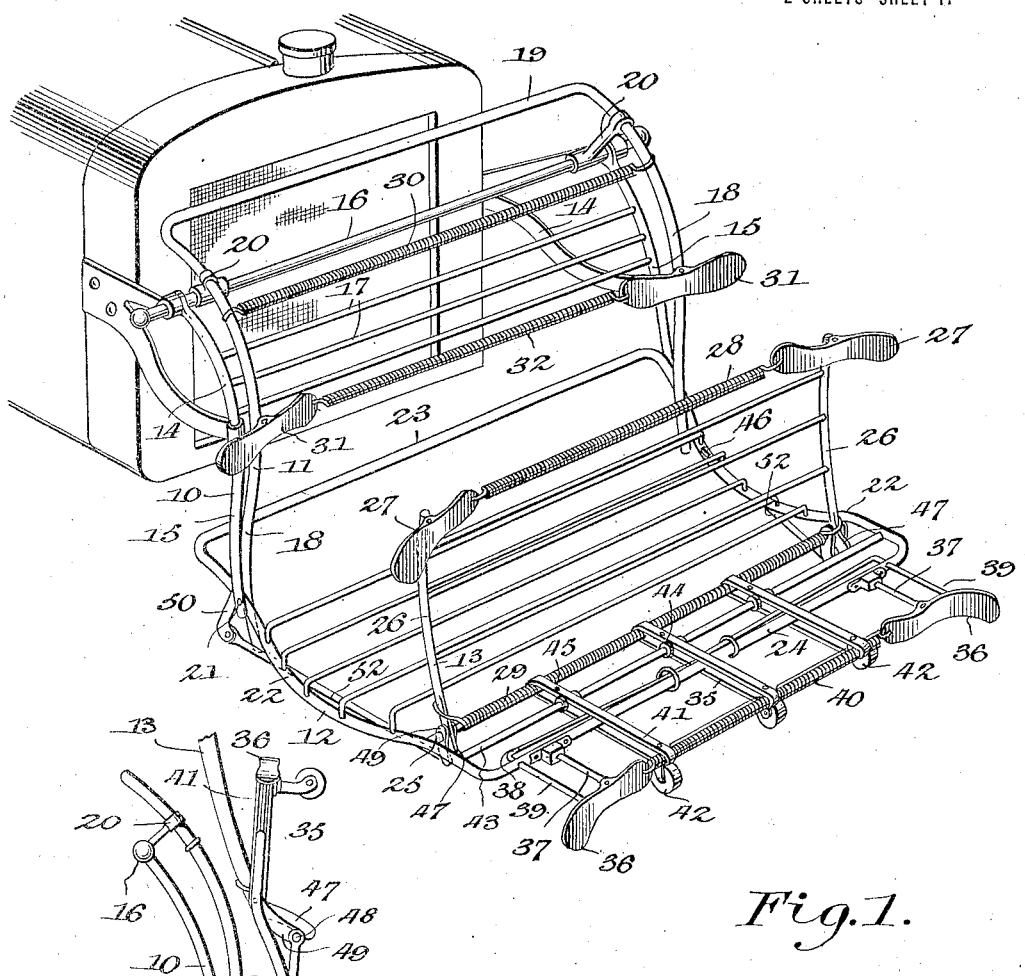
Figure 1 is a perspective view of the fender shown attached to a vehicle, portion of which has been shown.

Generally stated, the fender consists of frames 10 and 11 which have fixed relation to the vehicle, the pivoted frame 12, a swinging member 13 and cushioning means carried by the frames 11 and 12 and by the swinging member 13.

The frame 10 is carried by brackets 14 secured to the vehicle. The frame 10 consists of side rods 15—15, a transverse rod 16 and connecting rods 17, which connect the side rods 15. The frame 11 consists of side rods 18—18 and a connecting rod 19, the frame 11 being carried by the frame 10, as shown at 20. The frame 12 is pivoted as at 21 between the ends of the side rods of the frames 10 and 11. The frame 12 consists of side rods 22—22 and transverse connecting rods 23 and 24. The swinging member 13 is carried by the frame 12 near the forward end thereof and consists of a transverse rod 25 and rods 26—26 which are arranged for movement on the rod 25. A buffer 27 is pivoted to the upper end of each rod 26 and the buffers 27 are connected by a yieldable element in the nature of a spiral spring 28. Springs 29 arranged on the rod 25 serve as a cushioning means and permit the rods 26 and their connecting parts to move rearwardly and at the same time cause the return movement of these parts. The frame 11 is provided with cushioning means in the nature of springs 30 which connect the side rods 18 and buffers 31 which are pivotally mounted upon the frame 11, which buffers are connected together by a spring 32. Cushioning means 35 is carried by the frame 12 and consists of buffers 36 which are pivotally mounted at the ends of movable rods 37 which extend through blocks carried by the rod 24 and the rod 24 and contact flat springs 38 which are secured to the rod 24. Extensions 39 of the springs 38 extend through the rod 24 and have their free ends in engagement with the buffers 36. A flexible element 40 connects the buffers 36. The element 40 is supported by loops 41 which carry rollers 42. The loops 41 encircle the rods 24 and 25 and a rod 43, which rod 43 is provided with collars 44 to prevent lateral displacement of the loops 41. Stop pins 45 limit the rearward movement of the loops 41 with the effect that the member 35 can only have a limited degree of flexibility. The rollers 42 keep the frame 12 properly supported in space relation to the road surface. Lugs 26 on the side rods 22 of the frame 12 by reason of their engagement with the extremities of the side rods 18 of the frame 11 aid in the supporting of the frame 12.

Figure 2:
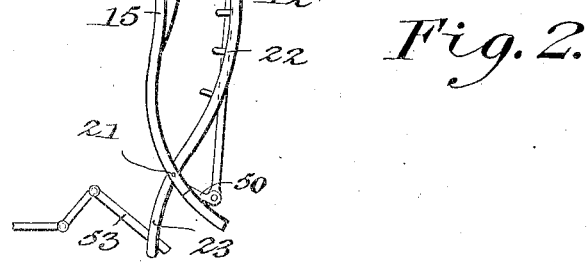
Fig. 2 is an elevation showing the folded condition of the fender.
Figure 3:
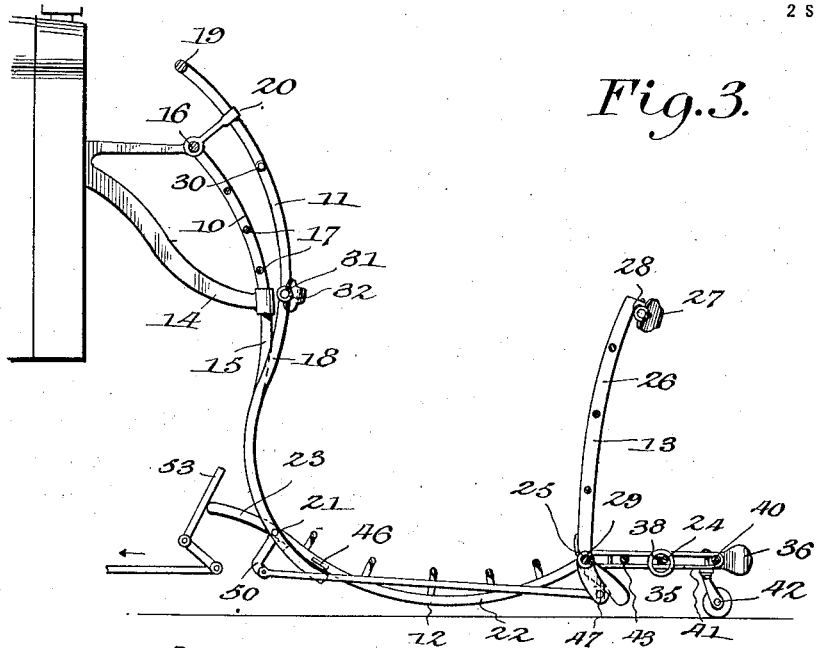
Fig. 3 is a central vertical longitudinal section of the fender.
Figure 4:
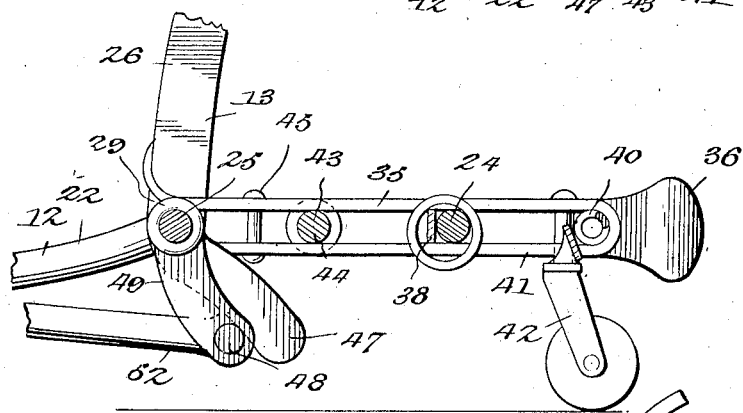
Fig. 4 is a detail sectional view.
Figure 5:
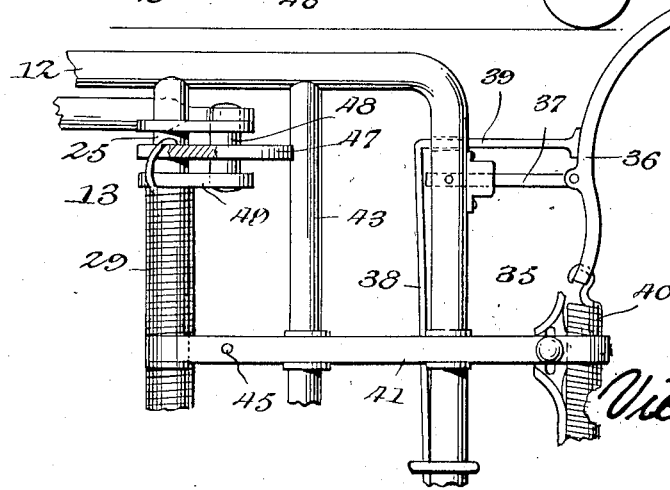
Fig. 5 is a fragmentary detail plan view.

In order that the frame 12 may be swung rearwardly on its pivots against the frames 10 and 11 and in order that the swinging member may not interfere with the swinging of the frame 12 there is provided certain actuating devices. The side rods 15 of the frame 10 at their extremities are each provided with an extension 46 and the rods 26 are each provided with extensions 47. Pins 48 are supported by arms 49 on the rod 25. Extensions 46 and pins 48 are connected by rods 52. Any suitable actuating means may be employed for swinging the frame 12 which includes a part similar to the part 53 for bearing down on the rear rod 23 of the frame 12, said action causes the member 13, to swing forwardly owing to the difference between the distance of the pivotal point of connection of the frame 12 and the point of connection of the rods 26 to rod 25 as compared with the distance between the points of connection of the rods 52 with the extensions 50 and pins 48. The folded condition of the fender being clearly shown in Fig. 2 of the drawing. The frames 11 and 12 and the member 13 may be provided with transverse connecting rods to prevent the body of an individual from falling through and to sustain it if thrust upon the fender.

What is claimed as new is:—

1. A device of the class described embodying a structure which includes a plurality of frames, cushioning means carried by certain of said frames, a cushioning swinging member carried by one of said frames, pivoted buffers carried by said member and a yieldable element connecting said buffers.

2. A device of the class described embodying a structure which includes a plurality of frames, cushioning means carried by certain of said frames, a cushioning swinging member carried by one of said frames, pivoted buffers carried by said member, a yieldable element connecting said buffers and means for effecting the movement of the swinging member to a set up position and its movement to a collapsed position accordingly as the device is moved to an active and inactive position.

3. A device of the class described, embodying a structure which includes a plurality of frames one of which has pivotal movement, a swinging member carried by the pivoted frame, cushioning means carried by the pivoted frame, which cushioning means includes rollers, and means for effecting the movement of the swinging member to a set up position and its movement to a collapsed position accordingly as the device is moved to an active and inactive position.

In testimony whereof I have affixed my signature.

MYER WILKENFELD.